May 17, 1938. C. R. SCHOCK ET AL 2,117,988
OVERHEAD TRAVELING CONVEYER
Filed Aug. 8, 1932 2 Sheets-Sheet 1
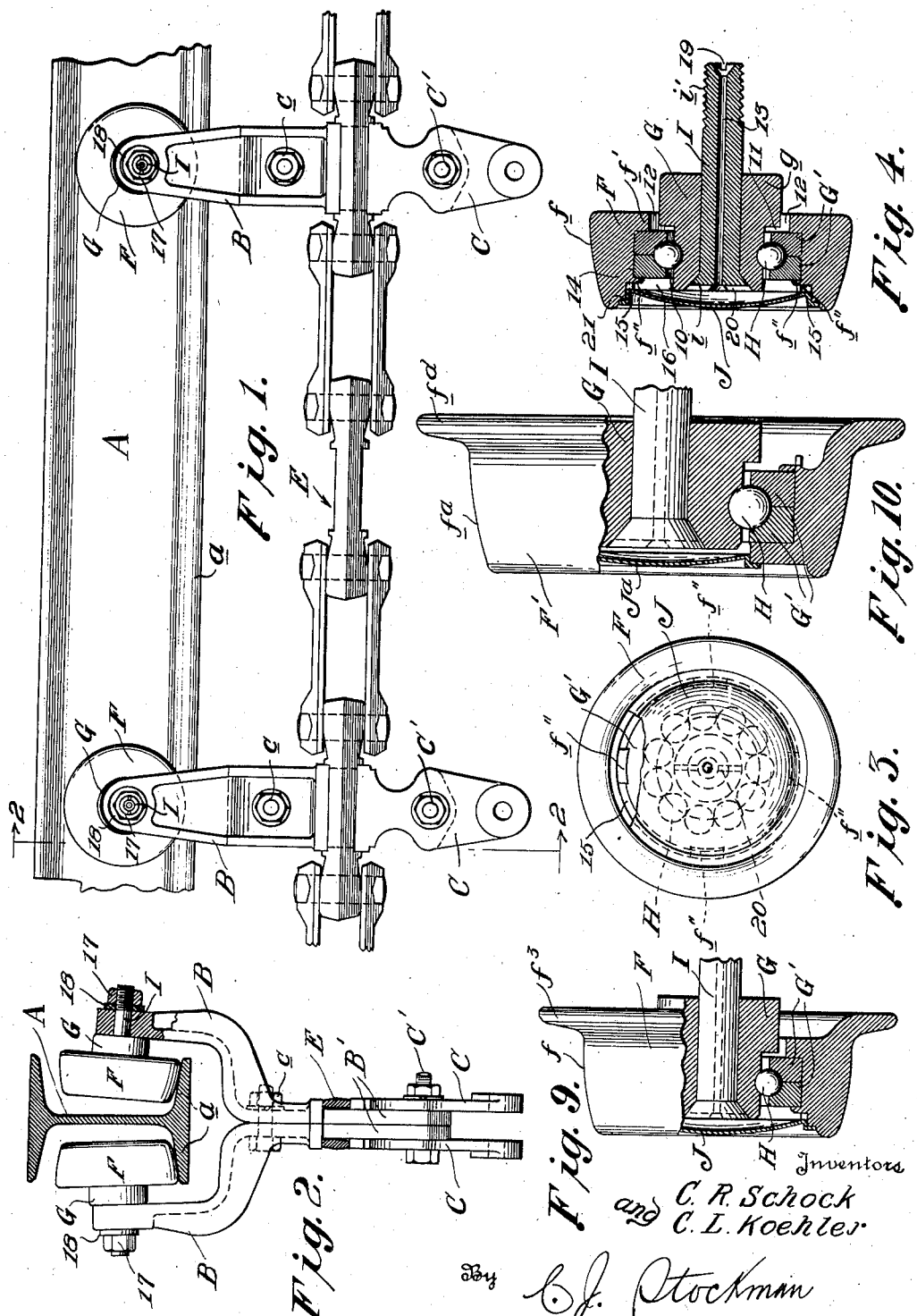

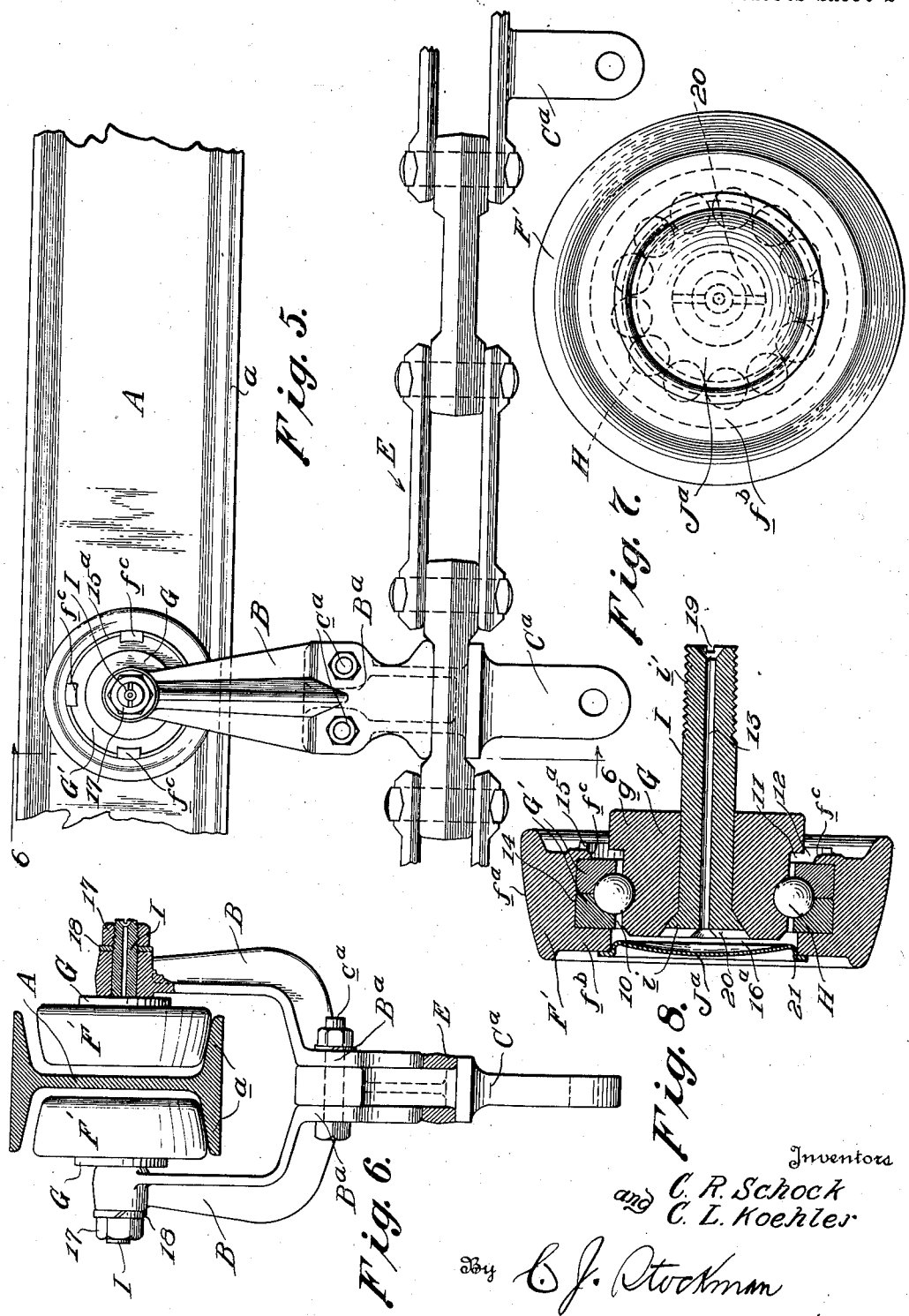

Patented May 17, 1938

2,117,988

UNITED STATES PATENT OFFICE 2,117,988

OVERHEAD TRAVELING CONVEYER

Charles Richard Schock, Madeira, and Christopher Liebel Koehler, Cincinnati, Ohio, assignors to The Alvey-Ferguson Company, Oakley, Cincinnati, Ohio, a corporation of Ohio Application August 8, 1932, Serial No. 627,976

3 Claims. (Cl. 105—154)

This invention primarily relates to certain improvements in self-lubricating wheels and particularly to a wheel structure adapted for use in conveying mechanisms for supporting the load carrying means of said mechanisms. One well known type of conveying mechanism to which the wheel of this invention is particularly applicable comprises overhead traveling carriages provided with downwardly extending load carrying members and connected with each other by a driven chain which imparts traveling movement thereto, said carriages being also provided with supporting (trolley) wheels which usually run on suitable tracks which cause the carriages to traverse a defined course.

The primary purpose of the invention is to improve in material respects the construction of the wheels hitherto employed, and particularly in respects which reduce the power required in the operation of the conveyer to a minimum and prolongs the life of the wheels. While the wheels have been referred to in their relation to conveying mechanisms of a particular type, since they were primarily especially designed for use in conveying mechanisms of said type, yet we would have it understood that these wheels in principle may be employed in other relations and, accordingly, it is not our desire to be restricted in respect of the uses to which they are to be put further than is called for by appended claims.

In accordance with the foregoing primary purpose of the invention we have provided a wheel characterized in that (1) its body is formed by a drop forging operation and contains provision for a ball bearing unit; (2) the ball bearing unit and body are relatively so formed that said unit may be readily inserted into said body and is held therein against accidental displacement relatively to said body; (3) the wheel includes facility for effective lubrication of its internal moving parts to thereby conduce to the easy running of the wheel and prolong the life thereof; (4) the wheel is sealed against access of dust and other foreign substances to the balls and the raceway in which the balls are mounted, which further contributes to the easy running qualities and prolongation of the life of the wheel; and (5) the means by which the wheel is attached to the conveyer carriage, or other part supported by the wheel, provides a readily accessible means by which an appropriate lubricant, as grease for example, may be supplied under pressure to a lubricant reservoir within the wheel.

Constructional forms of the invention, each embodying the foregoing features and by which the purposes underlying the invention are attained in the best manner, are shown in the accompanying drawings, wherein like characters of reference denote corresponding parts in the several views. In said drawings:—

Fig. 1 is a side elevation of a part of an overhead traveling conveyer provided with trolley wheels constructed in accordance with one form of this invention;

Fig. 2 is a vertical section on the line 2—2 of Fig. 1;

Fig. 3 is a side view of a smooth rim wheel, with a part broken away to more clearly show one of the lips $f''$;

Fig. 4 is a diametrical section through said wheel and its shaft, taken on a line which extends through certain of the lips $f''$;

Fig. 5 is a side elevation of a part of an overhead-trolley conveyer provided with trolley wheels of a larger size and slightly different construction from the wheel shown in preceding figures;

Fig. 6 is a vertical section on the line 6—6 of Fig. 5;

Fig. 7 is a side elevation of one of the latter wheels;

Fig. 8 is a diametrical section through said wheel and its shaft, taken on a line which extends through certain of the lips $f^c$; and Figs. 9 and 10, respectively, are views, partly in section, showing flanged rim wheels otherwise similar to the wheels shown in Figs. 3 and 4 and Figs. 8 and 9.

In all of the figures of drawings, A designates an I-beam whose flanges $a$ form tracks upon which the wheels, whose construction constitutes the principal part of the instant invention, will run and by which said wheels, and consequently the load supporting carriages supported by the wheels, are guided to traverse a defined course, which course, as is well understood, is laid out according to the particular requirements of any given installation. The upper end portion of each carriage employed in both of the illustrated embodiments of the invention resembles a trolley harp, since it comprises two members (B, B) arranged substantially parallel with each other throughout a part of their length and thence extending convergently toward each other. Each carriage also has its lower end portion formed of two arms (marked B' in Fig. 2 and B$^a$ in Figs. 5 and 6) which extend parallel with each other and are provided with appropriate means to which the load to be transported is connected. In the construction shown in Figs. 1 and 2 the means to which the load is to be connected comprises two members, C, C, which conjointly support the load, and the lower ends B', B' of the side members of the harp extend, for a considerable distance, between said two members C, C, the latter lying closely against the outer surfaces of the respective parts B' of the arms and being secured thereto, as shown at C', additional securing means, shown at c, being employed to secure the arms to each other at a place higher than the members C, C. In the construction shown in Figs. 5 and 6 the means to which the load is to be connected is provided by a single arm, marked C$^a$, which has its upper end arranged between the downwardly extending ends, marked B$^a$, of the side members of the trolley harp and is secured thereto near the upper ends of said side arms, as shown at c$^a$. In each of these conveyers an appropriate driven chain, as E, is employed to communicate traveling movement to the several carriages included in the system, and the chain and carriages are provided with suitable interengaged parts for the accomplishment of the stated purpose.

The harps which form parts of the referred to carriages have their portions B, B disposed on opposite sides of the I-beam A and it is to the upper ends of these portions, respectively, that the supporting wheels are connected, said wheels respectively running on the lower flanges a, a of the I-beam and being arranged on opposite sides of the central web of said beam.

No claim is based in the instant application upon the overhead traveling conveyer as thus far described, except in its relation to the wheels hereinafter particularly set forth.

Figs. 1 to 4, inclusive, show a smooth rim wheel and Fig. 9 a flanged rim wheel, preferably employed when the depth of the I-beam is three (3) inches or thereabout, and Figs. 7 and 8 show a smooth rim wheel and Fig. 10 a flanged rim wheel, preferably employed when the beam employed has a depth of about four (4) inches, these two sizes being typical.

Referring first to Fig. 4 of the drawings: F designates the body member of the wheel, said member having its outer circumferential surface, which forms its rim, f, formed convex to eliminate possibility of sliding action between said surface and the I-beam track in going around curves which, in turn, eliminates wear in the travel of the trolley wheel over the I-beam track and correspondingly eliminates the formation of iron dust due to such wear. This is important since iron dust is objectionable when paint is being, or is to be, sprayed on parts suspended from the conveyer.

The body F of the wheel is mounted to rotate with the outer race forming member G' of a ball bearing assembly and is so formed that said assembly may be inserted into the body as a unit and come to rest with its member G' against a flange f' which encircles the axial opening in the body member and is arranged at one side of the latter. The axial opening of the body member at the side opposite the flange f' is initially formed to permit the insertion of the ball bearing assembly from the latter side of the body and includes a deformable part which when said assembly has reached its final position in the body member is deformed to thereby provide one or more lips f'' which coöperate with the flange f' in holding the ball bearing assembly against displacement, as will be hereinafter described.

Since the ball bearing assemblies in both of the illustrated embodiments of the invention are identical, except as to size, similar reference characters are applied to the respective parts thereof, in both constructions. Each assembly includes an inner member G and an outer member, the outer member preferably comprising two rings G' mounted side by side and in contact with each other. The members G' conjointly form the outer race and the member G forms the inner race of an antifriction bearing which also includes a series of balls H. It will be noticed that the opposing surfaces of the outer race G' and inner race G are spaced from each other. This space provides a lubricant channel 10. It will also be noticed that the inner race G has a head g at its outer end and that the inner surface of this head is spaced from the corresponding end surface of the outer race G' to provide an angularly disposed channel 11 which has communication with the channel 10, and it will be further noticed that the diameter of the head g of the race G is less than the diameter of the opening in the body member into which said race G extends, thereby providing a space 12 through which the channel 11 is open to the outside.

The race G is formed with an axial opening through which extends a shaft or bolt I (hereinafter called "axle") having a longitudinal opening 13 extending entirely through it. This axle has its inner end formed to provide a head i which preferably is countersunk in the corresponding end of the inner race G. The other end of the bolt I extends outward from said race G and has its outer end portion threaded, as shown at i', for a purpose which will presently be set forth.

The body member of the wheel illustrated in Figs. 5-8, inclusive, is marked F' since it differs from the body member F of the wheel illustrated in Figs. 1-4, inclusive, not only in size, but also in respect of certain of its details. These two body members, however, are generically similar, each having at one side of its axial opening the outer race of the flange against which a ball bearing assembly comes to rest in the operation of inserting the latter into the body member and also having its side opposite said flange and through which side the ball bearing assembly is inserted constructed to be deformed after said assembly has been inserted to its final position in the body member, to thereby adapt it to coöperate with said flange in holding the ball bearing assembly against displacement.

These body members F, F' are drop forgings and preferably formed of 1035 steel. The races G and G' of the bearing proper are machined from solid bar stock and carbonized to harden the surfaces thereof which form the raceway for the balls.

The tread surface f$^a$ of the wheel body F' is convex, as is the tread surface f of the wheel body F, but the convexities of said surfaces, respectively, preferably differ from each other, the surface f$^a$ of the body (F') of the wheel for the four inch I-beam being on a radius of three and one-half inches (3½") and the corresponding surface f of the body (F) for the three inch I-beam being on a radius of two and three sixteenths inches (2$\frac{3}{16}$").

The axial surface of each wheel body F, F', to be engaged by the rings G' forming the outer race of the ball bearing assembly, is marked 14. The flange f' of the body F and the corresponding flange, marked f$^b$, of the body member F' respectively project toward the axes of the wheels and are arranged at one end of said surface 14. The body F in the drop forging operation is formed to provide an integral shoulder 15 at the end of the surface 14 opposite the flange f'. The body member F', however, in the forging operation, is formed with an integral ring 15ª, said ring being arranged at the end of the surface 14 and extending around the axis of the body, as shown best in Fig. 5. The opening through the shoulder 15 of the wheel body F is of the same diameter as that of the opening defined by the surface 14, as produced by the drop forging operation, and this is true also with respect to the diameter of the opening in the ring 15ª in relation to the surface 14 in the wheel body F'. Moreover, these openings are of the same diameter as that of the rings G' forming the outer race of the ball bearing assembly. Accordingly, it will be apparent that said ball bearing assemblies may be forced under pressure into their proper positions against the shoulders f' and f^b of the respective wheels, through the shoulder 15 in the one case and the ring 15ª in the other case.

As hereinbefore suggested, said shoulder 15 is adapted to be deformed and said ring 15ª also is adapted to be deformed, to enable them to cooperate with the flange f' in the one case and the flange f^b in the other case, in holding the respective ball bearing assemblies against displacement. In the case of the wheel body F, this deformation for the purpose stated is preferably accomplished by cutting out and bending over the shoulder 15 at an appropriate number of places to form a plurality of lips f'' whose inner surfaces bear tightly against the adjacent ring G': and in the case of the wheel body F' the deformation referred to is preferably accomplished by cutting out and bending over portions of the ring 15ª in an appropriate number of places to form a plurality of lips f^c. It has been our practice to force each ball bearing assembly into its seat in the appropriate body member under heavy pressure by means of a press which also has provision for the swaging or peening over of the parts of said body which are to form the lips hereinbefore referred to.

It will be noticed that in the wheel shown in Figs. 3 and 4 the lips f'' are at the left hand and the flange f' is at the right hand side of the wheel body, and this is true also in the wheel shown in Fig. 9: and that in the wheel shown in Figs. 7 and 8 (and this is true also of the wheel shown in Fig. 10) this relative position of the flange f^b and lips f^c is reversed, the flange f^b being at the left hand side and the lips at the right hand side of the body. It will also be noticed that the axial opening in the wheel at the side of the wheel opposite the headed or flanged end g of the member G of the ball bearing assembly is closed by a cap, marked J in Fig. 4 and J^a in Fig. 8. This cap is spaced from the inner end of said assembly so that a lubricant reservoir (16, Fig. 4 and 16ª, Fig. 8) is formed within the wheel. This lubricant reservoir is in communication with the channel 13 extending through the bolt I and also with the channels 10, 11 and 12 within the wheel. Lubricant is supplied to this reservoir through the channel 13 and passes through said channels 10 to the balls H and the surfaces contacted by said balls. The lubricant which we employ is a heavy grease or oil which is non-fluid at ordinary temperatures, and is supplied under pressure by an appropriate gun attached to the outer end of the axle I. It will be evident that the lubricant thus supplied under pressure covers all of the surfaces subject to wear and when all the channels are filled thereby forms a perfect dust seal, and that in renewing under pressure the supply of lubricant in the wheel, the pressure will force the old lubricant out from the reservoir and through the outlet formed by channels 11 and 12, along with any impurities which may have accumulated in said channels.

The axle I has a function additional to its function as a means through which lubricant is supplied to the interior of the wheel, since it also serves as a means by which the wheel is attached to an arm B of the trolley harp or carriage. Accordingly, it projects from the member G a sufficient distance to enable it to extend through said arm, and is held, preferably by a lock nut 17 and a lock washer 18, in a position in which the outer surface of the headed end g of the bearing is tightly engaged with the inner surface of the arm B.

Upon reference to Fig. 2 it will be seen that the wheels F are disposed in a laterally inclined position, and upon reference to Fig. 6 it will be noticed that the wheels, F', are disposed in an upright position.

The outer end of the axle I is formed with a groove, 19, to receive a screw driver in order that said axle may be held while the nut 17 is being applied or removed. The inner end of said axle may also be formed with a groove, 20, for a similar purpose, since the cap J or J^a is readily removable, being preferably formed of steel having sufficient tension to hold it against accidental displacement and yet permit its intentional removal without great difficulty. In respect of this cap it will also be noticed that it not only seals the inside face of the wheel so as to form a lubricant reservoir, but is so constructed as to force the heavy non-fluid oil or grease to travel through the channels between the outer and inner members of the raceway in the process of supplying the reservoir with said oil or grease. As here shown, each cap, J, J^a, is convexo-concavo in shape, and is formed with circumferential angularly disposed flanges 21 which, due to elasticity of said cap, are tightly forced against appropriate seats formed therefor in the body member F, or F', as the case may be.

It will be apparent that the wheels F and F' may have their rims formed smooth as shown in Figs. 3, 4, 7 and 8, or each provided with a peripheral flange, marked f^3 in Fig. 9 and f^d in Fig. 10: whichever is preferred in any given installation.

Having thus described the invention what we believe to be new and desire to secure by Letters Patent, is:

1. A trolley wheel assembly comprising a body portion having a peripheral bearing surface, a cylindrical bearing recess in the body portion having a solid flange on one side and a deformable projection on the other, a pair of complementary bearing members in the bearing recess located between the solid flange and the deformable projection, an axle having an opening therethrough for the passage of grease, a stationary bearing on the axle, anti-friction members between the complementary bearing members and the stationary bearing member, the body portion having a cap recess outwardly of the bearing recess and a removable cap having a surface coaction with the cap recess to form an effective but separable press-fit between the cap and body portion.

2. A trolley wheel assembly comprising a body portion having a peripheral bearing surface, a cylindrical bearing recess in the body portion having a solid flange on one side and a plurality of deformable projecting portions on the other, a pair of complementary bearing members in the bearing recess located between the solid flange and the projecting portions, an axle having an opening therethrough for the passage of grease, a stationary bearing on the axle, anti-friction members between the complementary bearing members, and the stationary bearing member, the body portion having a cap recess outwardly of the deformable portions and a removable cap having a surface coacting with the cap recess to form an effective but separable press-fit between the cap and body portion.

3. A trolley wheel assembly comprising a body portion having a peripheral bearing surface, a cylindrical bearing recess in the body portion having a solid flange on the outer side and a plurality of deformable projecting portions on the inner side, a pair of complementary bearing members in the bearing recess located between the solid flange and the projecting portions, an axle having an opening therethrough for the passage of grease, a stationary bearing on the axle, antifriction members between the complementary bearing members and the stationary bearing member, the body portion having a cap recess outwardly of the solid flange and a removable cap having a surface coaction with the cap recess to form an effective but separate press-fit between the cap and body portion.

CHARLES RICHARD SCHOCK.
CHRISTOPHER LIEBEL KOEHLER.